United States Patent [19]

Madgavkar et al.

[11] 4,381,641

[45] May 3, 1983

[54] SUBSTOICHIOMETRIC COMBUSTION OF LOW HEATING VALUE GASES

[75] Inventors: Ajay M. Madgavkar, Pittsburgh; Harold E. Swift, Gibsonia, both of Pa.

[73] Assignee: Gulf Research & Development Company, Pittsburgh, Pa.

[21] Appl. No.: 161,857

[22] Filed: Jun. 23, 1980

[51] Int. Cl.$^3$ .............................................. F02C 3/22
[52] U.S. Cl. .............................. 60/39.06; 60/39.465; 48/197 FM; 48/DIG. 6; 252/372
[58] Field of Search ..................... 60/39.06, 39.46 G; 48/DIG. 6, 197 FM; 252/372

[56] References Cited

U.S. PATENT DOCUMENTS 4,299,086  11/1981  Madgavkar et al. ............... 60/39.06

Primary Examiner—Robert E. Garrett
Attorney, Agent, or Firm—Deane E. Keith; Forrest D. Stine; Donald L. Rose

[57] ABSTRACT

The combustible component of a gas stream of low heating value is combusted using less than a stoichiometric amount of oxygen under conditions for the suppression of carbon monoxide including the presence of an oxidation catalyst and a small amount of arsine, and the heat energy in the combusted gas is utilized, for example, by expansion in a gas turbine.

18 Claims, No Drawings

SUBSTOICHIOMETRIC COMBUSTION OF LOW HEATING VALUE GASES

SUMMARY OF THE INVENTION

This invention relates to the catalyzed combustion of combustible gases of low heat content using less than a stoichiometric amount of oxygen. More particularly, this invention relates to the substoichiometric combustion of low heating value gases under catalytic conditions that minimize the amount of carbon monoxide in the product gas. In this process the low heating value gas is combusted in the presence of an oxidation catalyst such as platinum and a minute amount of arsine in the gas as a gaseous cocatalyst.

DETAILED DESCRIPTION OF THE INVENTION

Low heating value gas streams, such as waste gas streams, have traditionally been discharged to the atmosphere. In recent years a greater recognition and concern about atmospheric pollution has led to legal standards controlling the direct emission to the atmosphere of waste gases containing significant amounts of hydrocarbons and/or carbon monoxide. In order to avoid atmospheric pollution, the hydrocarbons and carbon monoxide in a waste gas stream of low heating value are completely combusted with a stoichiometric excess of oxygen for direct venting to the atmosphere. However, in recognition of the fact that a large amount of energy is contained in a large volume of low heating value gas, it has been suggested that the energy loss be reduced by recovering some of the heat energy of the fully combusted gas in a boiler or in a turbine before venting the combusted gas to the atmosphere.

In contrast, catalytically combusting a dilute hydrocarbon or carbon monoxide stream of low heating value with an insufficient, that is a substoichiometric, amount of air cannot result in complete combustion of the combustible components. The utilization of substoichiometric combustion of a low heating value gas may be desirable in certain circumstances, such as, for example, when the composition of the gas and therefore its heat content varies with time. The use of a constant substoichiometric amount of air for combustion results in a constant temperature in both the combustion zone and in the exiting combusted gas notwithstanding the variation in the heat content of the low heating value gas. The constant temperature in the combustion zone protects the oxidation catalyst against damage from cycles of thermally induced expansion and contraction, which can be a significant problem, particularly when large catalyst structures are required to handle very large volumes of low heating value gas. Furthermore, if this combusted gas of constant temperature is used to drive a gas turbine, the turbine blades are also protected against damage from thermal cycles, which is particularly desirable with gas turbines which are designed for constant temperature operation. However, a substantial problem resulting from the substoichiometric combustion of large quantities of low heating value gas streams is the production and discharge to the atmosphere of significant amounts of carbon monoxide.

We have discovered that a low heating value gas stream can be combusted using less than the amount of air required for stoichiometric combustion under conditions, including a suitable oxidation catalyst and the presence in the gas of a minute amount of arsine, that minimize the amount of carbon monoxide in the combusted gas. A supported platinum catalyst is preferred as the oxidation catalyst because platinum is both highly active as an oxidation catalyst and is also relatively sulfur tolerant. Other oxidation catalysts can also be used such as ruthenium, palladium, rhodium, osmium, iridium, vanadium, cobalt, nickel, iron, copper, manganese, chromium, molybdenum, titanium, silver, cerium, and the like. Suitable mixtures of these oxidation catalysts can also be used. A platinum and solid cocatalyst combination can be used of the type described in U.S. Pat. Nos. 4,191,733 and 4,250,962 for further enhanced carbon monoxide suppression. The solid cocatalyst, as described, is selected from Groups II and VIIB, Group VIII up through atomic No. 46, the lanthanides, chromium, zinc, silver, tin and antimony.

It is surprising that arsine in the gas stream is beneficial according to our process, since arsenic, a recognized catalyst poison, particularly with Group VIII metals of the periodic table, can readily deactivate the oxidation catalyst. However, we have discovered that the beneficial effects of carbon monoxide suppression can be obtained at arsine levels in the low heating value gas undergoing substoichiometric combustion, which are below the concentration that will poison the oxidation catalyst. In short, we have discovered that arsine in a low heating value gas will help to minimize the amount of carbon monoxide resulting from substoichiometric combustion and we have further discovered that this benefit can be obtained at levels of arsine in the gas which are too low to cause catalyst poisoning or deactivation.

Since some arsine must be present, we can broadly define the minimum amount of arsine that must be present to obtain a noticeable reduction in the carbon monoxide as broadly being at least about 0.1 ppm (parts of arsine per million parts of the low heating value gas undergoing substoichiometric combustion) and preferably at least about 0.2 ppm. Since the susceptibility to catalyst poisoning by arsenic depends on the specific catalyst that is involved, the maximum allowable concentration therefore depends on the oxidation catalyst that is used. However, within this constraint we can in general define the maximum arsine concentration as broadly being about 50 ppm. and preferably being about 10 ppm. Since the Group VIII metals including platinum are particularly susceptible to arsenic poisoning, the maximum arsine content of the low heating value gas undergoing substoichiometric combustion in the presence of an oxidation catalyst which contains a Group VIII metal is preferably about five ppm and most preferably about two ppm if catalyst poisoning is to be avoided. Using a larger quantity of arsine than is necessary to suppress carbon monoxide is, in general, not desired for the further reason that the waste gas clean-up problems required to avoid environmental pollution are increased without any compensating advantage.

There are many types and sources of low heating value gases which can advantageously be combusted by our process, including those low heating value gases which are waste gases as well as those low heating value gases which are intentionally produced. Thus, low heating value gas streams predominating in hydrocarbon combustibles are produced as the liquids-free flue gas by-product obtained from the subterranean in situ combustion processes for the recovery of hydrocarbons from carbonaceous deposits such as petroleum reservoirs, tar sands, oil shale formations, and the like. Or a low heating value gas stream can itself be produced as the primary product such as the low heating value gas stream resulting from the underground combustion of difficult to mine coal deposits. The low heating value gas stream can also be either intentionally produced in a factory operation or it can be a factory waste gas stream including synthesis and producer gas; blast furnace gas; waste gases resulting from phosphorus furnaces; from plants manufacturing acetylene gas and from various metallurgical and chemical manufacturing; gas streams involved in the evaporation of hydrocarbon solvents; and the like.

The low heating value gas can contain hydrocarbons as its primary combustible component such as those gas streams resulting from the in situ combustion of petroleum reservoirs, tar sands or oil shale formations. Alternatively, the primary combustible component can be carbon monoxide and hydrogen which is the case with synthesis gas and the gas streams resulting from underground coal gasification. Or both hydrogen and hydrocarbons or these two plus carbon monoxide can be present in significant amounts. In general, the present process is directed to those low heating value gas streams containing a significant proportion of their fuel value as either hydrocarbons, carbon monoxide or both.

The hydrocarbons present in these streams have up to about seven carbon atoms in their molecule with methane generally being the predominant hydrocarbon component. When a mixture of dilute gaseous hydrocarbons is burned in a deficiency of air, the higher hydrocarbons burn most readily while the lower the number of carbon atoms in the molecule the more resistant to combustion is the hydrocarbon. As a result methane is the primary unburned component in a partially combusted mixture of gaseous hydrocarbons. This is fortuitous since methane is not regarded as a pollutant when discharged into the atmosphere in moderate amounts.

Although carbon monoxide is generally thought of as the primary product resulting from the incomplete combustion of carbonaceous material, incomplete combustion can occur without the production of substantial carbon monoxide. And even the partial combustion of a low heating value gas stream predominating in carbon monoxide can occur with a minimized amount of carbon monoxide in the combustion gas, provided that there is some hydrogen or water vapor present. We believe that the suppression of carbon monoxide in the partially combusted low heating value gas using the present catalyst system, including arsine, of out present process involves the oxidation reaction $2CO + O_2 \rightleftharpoons 2CO_2$ as well as secondary reactions including the steam reforming reaction $CH_4 + H_2O \rightleftharpoons CO + 3H_2$ and the water shift reaction $CO + H_2O \rightleftharpoons CO_2 + H_2$. It is readily apparent that a favorable shift in the equilibrium of each reaction will operate to reduce the amount of carbon monoxide in the partially combusted product gas stream. We believe that our catalyst system functions, at least in part, by shifting the reaction equilibrium of the system.

We find that the present process is suitable with low heating value gas streams having a heating value as low as about 15 Btu/scf (one British thermal unit per standard cubic foot at atmospheric pressure and 60° F., 15.6° C., equals 9.25 kilocalories per cubic meter) but we prefer that the heating value of the gas stream be at least about 30 Btu/scf. The maximum heating value of the gas stream undergoing combustion by our process will broadly be about 200, more generally a maximum of about 150, and most likely will have a maximum of about 100 Btu/scf.

Since arsine, $AsH_3$, is an essential component of the low heating value gas undergoing substoichiometric combustion by the present combution process, the arsine must be added to the gas in an appropriate amount prior to the combustion zone. We prefer that the gas contain a minimum but suitable amount of arsine to obtain the desired reduction in carbon monoxide such as described above. Since the arsenic present, primarily as an oxide, in the combusted gas is also a pollutant, it will generally be removed from the combusted gas, such as by subjecting the combusted gas to a conventional scrubber designed for arsenic removal prior to venting. It is possible, particularly with certain subterranean in situ combustion processes, that arsine will be added to the gas stream as a natural process resulting from the presence of arsenic compounds in the underground formation. If there is too much arsine naturally present in the gas prior to combustion, an excess portion can be removed prior to combustion with the remaining amount of arsenic that is left in for the operation of the present invention being removed after combustion. On the other hand the low heating value gas may contain a desirable quantity of naturally present arsine. Rather than scrubbing out the arsenic prior to combustion, it can be left in the gas stream to obtain the benefit of the present invention and then it can be removed from the combusted gas stream prior to venting to the atmosphere.

Since hydrogen sulfide will form sulfur dioxide as a combustion product, which is controlled as a pollutant, its significant presence in the waste gas is undesired. Additionally, the presence of hydrogen sulfide can affect the catalyzed combustion reaction in several respects such as by inducing a lowering in the overall conversion of any hydrocarbons which are present and by causing an increase in the temperature required for the maintenance of continuous combustion. For these reasons, the amount of hydrogen sulfide in the waste gas stream undergoing substoichiometric combustion is desirably no more than about two weight percent and preferably a maximum of about 0.5 weight percent.

As described, the combustion process of our invention relates to the catalyzed combustion of low heating value gas streams with insufficient oxygen for complete combustion. It is also possible and generally desirable to preheat the gas stream if it is of such low heating value that it will not support combustion when it is at ambient temperature (that is, about 25° C.), even in the presence of an oxidation catalyst. In this instance the preferred means of preheating the gas stream, either together with or in the absence of the air for combustion, is by heat exchange with the hot combusted gas stream. In a two-stage combustion process the waste gas stream is preferably preheated by exchange with the combusted gas exiting from the first stage.

The temperature of the combusted gas stream available for preheating is dependent on a number of factors including the heating value of the gas stream undergoing combustion, the amount of air that is used for combustion and the temperature to which the feed gas stream is preheated. The temperature to which the gas is preheated is not critical other than it be sufficiently high to support combustion under the particular conditions involved. The pressure present in the combustion zone also is not critical, varying from about atmospheric up to about 2,000 psi, more generally up to about 500 psi.

The oxidation catalyst that is used in our substoichiometric combustion process is desirably carried on an inert support. Since the catalytic combustion inherently involves a relatively large volume of the stream of low heating value gas, the support is preferably of a design to permit good solid-gas contact at relatively low pressure drop. A suitable support can be formed as a monolith with hexagonal cells in a honeycomb design. Other cellular, relatively open-celled designs are also suitable.

The support for the catalysts to be used in the process of this invention can be any of the refractory oxide supports well known in the art, such as those prepared from alumina, silica, magnesia, thoria, titania, zirconia, silica-aluminas, silica-zirconias, magnesia-aluminas, and the like. Other suitable supports include the naturally occurring clays, such as diatomaceous earth. Additional desirable supports for use herein are the more recently developed corrugated ceramic materials made, for example, from alumina, silica, magnesia, and the like. An example of such material is described in U.S. Pat. No. 3,255,027 and is sold by E. I. duPont de Nemours & Company as Torvex. More recently, metallic monoliths have been fabricated as catalyst supports and these may be used to mount the catalytic material. An example of these supports is Fecralloy manufactured by Matthey Bishop, Inc. under U.S. Pat. Nos. 3,298,826 and 3,920,583.

If desired, the catalyst and solid cocatalyst, if used, can be mounted directly onto the surface of the monolith. Or the monolith can first be coated with a refractory oxide, such as defined above, prior to the deposition of these materials. The addition of the refractory oxide coating allows the catalyst to be more securely bound to the monolith and also aids in its dispersion on the support. These coated monoliths possess the advantage of being easily formed in one piece with a configuration suitable to permit the passage of the combustion gases with little pressure drop. The surface area of the monolith generally is less than one square meter per gram. However, the coating generally has a surface area of between about ten and about 300 m$^2$/g. Since the coating is generally about ten percent of the coated support, the surface area of the coated support will therefore generally be between about one and about 30 m$^2$/g.

In preparing the platinum and solid cocatalyst combination it is preferred that the cocatalyst be placed on the support before the platinum. However, the reverse order of emplacement is also suitable or the platinum and solid cocatalyst can be added in a single step. In the preferred procedure a suitable salt of the cocatalyst metal is dissolved in a solvent, preferably water. The support is impregnated with the solution of the cocatalyst metal. In a preferred embodiment the impregnated support is next gassed with a suitable gas, generally ammonia or hydrogen sulfide, to cause the catalyst metal to precipitate uniformly on the support as the hydroxide or sulfide as the case may be. It is then dried and calcined in air at about 800° to 1200° F., preferably at about 1000° F. Hydrogen may be used to reduce the cocatalyst compound to the metal if desired.

Platinum is impregnated onto the support, either alone or in association with a solid cocatalyst as an aqueous solution of a water-soluble compound such as chloroplatinic acid, ammonium chloroplatinate, platinum tetramine dinitrate, and the like. The composite is then gassed with hydrogen sulfide in a preferred embodiment to cause precipitation of the platinum as the sulfide to ensure uniform distribution of the platinum on the support. It is again dried and then calcined in air at about 800 to 1200° F., preferably at about 1000° F. The same general procedure can be used for the incorporation of a different oxidation catalyst on the support. In general, it is not certain whether calcination converts the catalyst metal sulfides and hydrated sulfides to another compound or how much is converted to the oxide, sulfite or sulfate, or to the metal itself. Nevertheless, for convenience, the noble metals such as platinum are reported as the metal and the other catalyst metals are reported as the oxide.

The supported catalyst is prepared so that it contains between about 0.005 and about 20 weight percent of the catalyst metal reported as the oxide, and preferably between about 0.1 and about 15 weight percent of the metal oxide. The platinum or other noble metal is used in an amount to form a finished supported catalyst containing between about 0.005 and about ten weight percent of the metal, and preferably about between 0.01 and about seven weight percent of the metal. When the platinum and solid cocatalyst combination is used, the relative amount of the solid cocatalyst and the platinum has an effect on the combustion, including an effect in the amount of carbon monoxide in the combusted gas. The solid catalyst combination will broadly contain a mol ratio of cocatalyst as the oxide to platinum as the metal of between about 0.01:1 and about 200:1, preferably between about 0.1:1 and about 100:1, and more preferably between about 0.5:1 and about 50:1.

The gas stream of low heating value can contain at least fifty mol percent and even ninety mol percent or higher of its heat content in the form of one or more hydrocarbons having from one to about seven carbon atoms, including aliphatic, alicyclic and aromatic hydrocarbons. But as indicated, the gas stream can also contain other combustibles including hydrogen and carbon monoxide, which can comprise as high as about fifty mol percent or higher of its heat content. Some low heating value gases may essentially contain only hydrogen and carbon monoxide such as dilute synthesis gas or the product of in situ coal gasification. In the substoichiometric combustion of these various low heating value gas streams, the air equivalence ratio (the ratio of the amount of air utilized to the amount required for stoichiometric combustion of all combustibles) will be at least about 0.20 and preferably at least about 0.35 and a maximum of about 0.95 and preferably a maximum of about 0.85. In combusting this low heating value gas, it must be heated to its combustion, or light-off temperature, which depends on the particular composition of the gas, and the particular oxidation catalyst, prior to contacting the gas stream with the catalyst.

DESCRIPTION OF PREFERRED EMBODIMENTS

The reactor used in the following experiments, at atmospheric pressure was a one-inch I.D. forged steel unit which was heavily insulated to give adiabatic reaction conditions. The reactor used in the combustion under pressure was made from Incoloy 800 alloy (32 percent Ni, 46 percent Fe and 20.5 percent Cr) but was otherwise the same. The catalyst consisted of three one-inch monoliths wrapped in a thin sheet of refractory material (Fiberfrax, available from Carborundum Co.). The catalyst compositions as specified, are only approximate because they are based on the composition of the impregnating solution and the amount absorbed and are not based on a complete chemical analysis of the finished catalyst. Well insulated preheaters were used to heat the gas stream before it was introduced into the reactor. The temperatures were measured directly before and after the catalyst bed to provide the inlet and outlet temperatures. An appropriate flow of preheated nitrogen and air was passed over the catalyst until the desired feed temperature was obtained.

Preheated hydrocarbon was then introduced at a gas hourly space velocity of 30,000 per hour on an air-free basis and combustion was allowed to proceed until steady state conditions were reached. The feed gas stream contained 94.5 mol percent nitrogen, 3.75 mol percent methane, 0.98 mol percent ethane, and 0.77 mol percent propane. The heating value of this feed stream is about 75 Btu/scf. The experiments were conducted at atmospheric pressure or at a slightly elevated pressure. The analyses were made after steady state conditions were reached on a water-free basis. The conversion is the overall conversion of all hydrocarbon constituents. No measurable free oxygen occurred in the product gas stream.

EXAMPLE 1

A catalyst was made containing about 0.5 percent platinum on a Torvex support. The support was a mullite ceramic in the shape of a honeycomb having a coating of alumina of about 25 m$^2$/g surface area. The support was soaked in an aqueous solution of chloroplatinic acid containing 23 mg of platinum per ml for 15 minutes. After removing excess solution from the support material, it was gassed with hydrogen sulfide for about 30 minutes to precipitate the platinum as platinum sulfide. The catalyst was then dried at 120° C. and calcined at 1000° F. (538° C.).

This catalyst was first used in the combustion of the gas in the absence of arsine. The light-off temperature was 430° F. and the temperature of the exiting gas was 1,244° F. After a period of operation five ppm of arsine were added to the gas and the light-off temperature increased to 450° F. and the temperature of the exiting gas increased to 1,372° F. The amount of arsine was then increased to ten ppm and the light-off temperature remained at 450° F. while the exit temperature increased to 1,404° F. This combustion was carried out with ten ppm arsine until the catalyst died. The air equivalence ratio (AER) was 0.6 (more exactly 0.6:1) throughout the experiment. The analytical data is set out in Table I.

TABLE I

| AsH$_3$, ppm | Duration, hr:min | Combusted gas, mol % CO | CO$_2$ | Conversion, % |
|---|---|---|---|---|
| 0 | 5:28 | 2.95 | 2.83 | 100 |
| 5 | 5:25 | 0.89 | 3.03 | 58.7 |
| 10 | 5:35 | 0.51 | 3.11 | 54.2 |

The above combustion had been carried out until the catalyst died. At this point it was determined that about 0.320 g of arsine had been passed over the catalyst.

EXAMPLE 2

A second catalyst containing about 0.5% platinum and prepared as described in Example 1 was used in a similar experiment at an AER of 0.6 except that the maximum amount of arsine added to the gas was five ppm. The light-off and exiting gas temperature were 410° F. and 1,253° F., with no arsine present and 450° F. and 1,379° F. with five ppm arsine. The analytical results are set out in Table II.

TABLE II

| AsH$_3$, ppm | Duration, hr:min | Combusted gas, mol % CO | CO$_2$ | Conversion, % |
|---|---|---|---|---|
| 0 | 2:33 | 2.79 | 2.86 | 100 |
| 2 | 3:21 | 2.07 | 3.07 | 88.6 |
| 2 | 4:05 | 1:13 | 2.97 | 64.9 |
| 2 | 11:59 | 0.84 | 3.05 | 61.2 |
| 5 | 6:13 | 0.66 | 3.08 | 55.5 |

This combustion also stopped due to the deactivation of the catalyst. It was determined that a total of 0.281 g of arsine had passed over the catalyst, which is an atomic ratio of arsenic to platinum of approximately 7:1.

EXAMPLE 3

A third catalyst substantially identical to the two preceding catalysts was again used. Additionally, the same procedure including an AER of 0.6 was used except that two ppm arsine was the maximum amount added to the feed gas. The light-off and exiting gas temperatures were similar to the preceding experiments. The analytical results are set out in Table III.

TABLE III

| AsH$_3$, ppm | Duration, hr:min | Combusted gas, mol % CO | CO$_2$ | Conversion, % |
|---|---|---|---|---|
| 0 | 3:06 | 2.84 | 2.82 | 100 |
| 2 | 2:03 | 2.49 | 3.01 | 100 |
| 2 | 5:33 | 1.03 | 3.04 | 68.6 |
| 2 | 49:24 | 0.79 | 2.99 | 59.5 |
| 2 | 21:00 | 0.90 | 2.91 | 56.2 |

The oxidation experiment was stopped without any apparent drop in catalyst activity. At this time a total of 0.602 g of arsine had been passed over the catalyst which amounts to an atomic ratio of arsenic to platinum of approximately 15:1. The complete gas analysis in mol percent at the termination of the experiment was nitrogen 94.1, argon 0.32, methane 1.55, ethane 0.12, ethylene 0.03, propane 0.07 and the data in the bottom line of Table III.

The three catalyst pieces were analyzed for arsenic after 57 hours of operation with two ppm of arsine in the feed stream and were found to contain an average of 0.07 weight percent arsenic. Analysis after an additional 21 hours for a total of 78 hours of operation in the presence of two ppm of arsine again showed an average arsenic content in the three catalytically active catalyst pieces of 0.07 percent arsenic. The three pieces of the dead catalyst resulting from Example 2 were also analyzed and found to contain an average of 0.14 percent arsenic.

The information obtained from these experiments is utilized in an integrated oil shale recovery operation by in situ combustion according to the following example.

EXAMPLE 4

A modified in situ oil shale retort is initiated in an oil shale zone in an underground reservoir at an overall depth of about 1,000 feet. The fire is initiated in the formation and steady state conditions are reached in about four weeks. At this time about 50 million scf per day of air and about 7 million scf per day of steam at a temperature of about 300° F. and a pressure of about 50 psi are pumped into the in situ retort by a multistage centrifugal blower, which is driven by a gas turbine. The combusted gas containing some entrained hydrocarbon liquids is separated from the bulk of the oil shale liquids at the bottom of the retort and is directed aboveground. The entrained liquids are removed in a separator resulting in about 41.2 million scf per day of liquid-free waste flue gas of low heat content. The temperature of this flue gas is about 95° F. and its pressure is about 10 psig. This gas is treated for sulfur removal using a Stretford unit, which converts the hydrogen sulfide to elemental sulfur, and is then sent to the combustor. Its average analysis over a 19-day period is about 1.2 percent methane, about 0.3 percent ethane, about 0.1 percent ethylene, about 0.2 percent propane, about 0.2 percent butane and higher, about 4.2 percent hydrogen, about 1.1 percent carbon monoxide, about 10 ppm sulfur, about 2 ppm arsine, about 37 percent carbon dioxide, about one percent argon and the remainder nitrogen. Its heat content varied over this 19-day period having a maximum value of about 91 Btu/scf and a minimum value of about 61 with an average of about 75 Btu/scf.

This flue gas is compressed to 100 psig and fed to a two-stage combustor. The catalyst in the first stage is a monometallic oxidation catalyst comprising about 0.5 percent platinum impregnated on an alumina-coated Torvex monolithic ceramic support. The catalyst in the second stage is a bimetallic platinum oxidation catalyst comprising about one percent cobalt oxide and about 0.3 percent platinum on the same support as used in the first stage. Over this 19-day period under study the flue gas is combusted by the injection of a constant amount of air, approximately equally divided between the input to each combustion stage, to provide an average air equivalence ratio of about 0.64. As a result, the combustion is substoichiometric over the entire 19-day period. The flue gas-air mixture is heated above its ignition temperature by heat exchange with the combusted gas from the first stage before it is introduced into the first combustor. The combusted flue gas is mixed with the second portion of combustion air after the heat exchanger and prior to entering the second combustor. The gas stream leaving the second combustor has a temperature of about 1,550° F. This hot gas stream is used to drive the gas turbine which is designed for an operating temperature of 1,450° F. Therefore, a sufficient quantity of the 200° F. compressed air is bled from the compressed air line and injected into the combusted flue gas prior to the turbine inlet to drop its temperature to about 1,450° F. The combusted flue gas is introduced into the turbine at a pressure of about 90 psig and exits at near atmospheric pressure. The turbine exhaust contains less than one percent carbon carbon monoxide permitting it to be vented directly to the atmosphere.

The gas turbine can be operated at a temperature as low as about 1,200° F. or even lower, but since efficiency exhibits a significant drop at the lower temperatures, it is preferred to operate at a temperature at which significant efficiency is obtained, and particularly a temperature of at least about 1,400° F. The maximum temperature is determined by the temperature resistance of the materials from which the turbine is constructed and can be about 2,000° F. or even higher particularly if the compressor is designed with provision for auxiliary cooling but it is preferred that the maximum operating temperature be about 1,800° F. Generally, a large capacity turbine of the type which would be used in the utilization of waste gases from subterranean in situ combustion processes is designed for optimum operation within a specific restricted temperature range.

In the two-stage combustion procedure, it is desirable if at least about one-thid of the total air which is to be used in the substoichiometric combustion be added in one combustor, and it is generally preferred that about one-half of this combustion air be added in each combustor. This variation in the amount of combustion air added to each combustor permits the temperature of the waste gas stream, entering the first stage reactor following heat exchange with the combusted gas from the first stage, to be varied. This air that is used for combustion of the waste gas, as well as the air that may be used for cooling the combusted waste gas down to the desired turbine operating temperature, needs to have a pressure only moderately higher than the pressure of the gas streams into which it is injected. For this reason, it is preferred that this air be obtained from a separate low pressure compressor or from a low pressure stage in the multistage compressor rather than using the high pressure air that is obtained for injection into the in situ combustion zone.

It is to be understood that the above disclosure is by way of specific example and that numerous modifications and variations are available to those of ordinary skill in the art without departing from the true spirit and scope of the invention.

We claim:

1. A method for the recovery of energy from a gas stream having an average heating value in the range of about 15 to about 200 Btu/scf and having a combustible component comprising one or more hydrocarbons having from one to about seven carbon atoms, carbon monoxide or mixtures thereof and up to about 50 mol percent hydrogen, which comprises the steps analyzing said gas stream for the presence of arsine, adjusting the quantity of arsine in said gas stream as necessary to provide an amount between about 0.1 ppm and about 50 ppm arsine, passing said gas stream admixed with air for combustion at an average air equivalence ratio of between about 0.2 and about 0.95 in contact with an oxidation catalyst in at least one combustion zone at a temperature high enough to initiate and maintain combustion of said gas stream, and utilizing the heat energy produced in said gas stream by said combustion.

2. A method for the recovery of energy from a gas stream in accordance with claim 1 in which aliphatic hydrocarbons comprise at least about 50 mol percent of the combustible component.

3. A method for the recovery of energy from a gas stream in accordance with claim 2 in which methane comprises at least about 50 mol percent of the combustible component of the gas stream.

4. A method for the recovery of energy from a gas stream in accordance with claim 1 in which the combustible component predominately comprises a mixture of carbon monoxide and hydrogen.

5. A method for the recovery of energy from a gas stream in accordance with claim 1 in which the gas stream contains from about 0.2 to about 5 ppm arsine during combustion and the oxidation catalyst comprises platinum.

6. A method for the recovery of energy from a gas stream in accordance with claim 1 in which the air equivalence ratio is between about 0.35 and about 0.85.

7. A method for the recovery of energy from a gas stream in accordance with claim 5 in which the catalyst contains between about 0.005 and about ten weight percent platinum on a support.

8. A method for the recovery of energy from a gas stream in accordance with claim 5 in which the catalyst contains between about 0.01 and above seven weight percent platinum on a support.

9. A method for the recovery of energy from a gas stream in accordance with claim 1 in which the average heating value of said gas stream is between about 30 Btu/scf and about 150 Btu/scf.

10. A method for the recovery of energy from a gas stream in accordance with claim 1 in which the air is added for combustion at a substantially constant rate with time.

11. A method for the recovery of energy from a gas stream in accordance with claim 10 in which the heating value of the gas stream varies with time.

12. A method for the recovery of energy from a gas stream in accordance with claim 11 in which the air feed rate will not result in a substantial stoichiometric excess of oxygen during a period of minimum heating value.

13. A method for the recovery of energy from a gas stream in accordance with claim 1 in which the average heating value of said gas stream is between about 30 and about 100 Btu/scf.

14. A method for the recovery of energy from a gas stream in accordance with claim 1 in which the gas stream to the combustion zone is heated to combustion temperature by heat exchange with the combusted gas.

15. A method for the recovery of energy from a gas stream in accordance with claim 1 in which the gas stream following combustion is expanded in a gas turbine for the delivery of mechanical energy.

16. A method for the recovery of energy from a gas stream in accordance with claim 15 in which the said gas stream and a portion of the air required for partial combustion is passed in contact with each of two oxidation catalysts in series in two stages.

17. A method for the recovery of energy from a gas stream in accordance with claim 16 in which at least one-third of said combustion air is added to the gas stream prior to combustion in each stage.

18. A method for the recovery of energy from a gas stream in accordance with claim 16 in which about fifty percent of said combustion air is added prior to each stage.

* * * * *